United States Patent
de Bonneville

(12)
(10) Patent No.: US 6,544,408 B1
(45) Date of Patent: Apr. 8, 2003

(54) PROCESS AND INSTALLATION FOR THE PRODUCTION OF AROMATIC COMPOUNDS IN A FIXED BED

(75) Inventor: Jean de Bonneville, Rueil Malmaison (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/524,551

(22) Filed: Mar. 13, 2000

(30) Foreign Application Priority Data

Mar. 12, 1999 (FR) .............................. 99 03137

(51) Int. Cl.⁷ .................. C10G 35/06; C07C 15/00; C07C 2/52
(52) U.S. Cl. .................. 208/137; 208/134; 208/138; 585/412; 585/414; 585/441; 585/444; 585/447
(58) Field of Search ................ 585/412, 419, 585/441, 444, 447, 449, 903, 910; 208/134, 137, 138

(56) References Cited

U.S. PATENT DOCUMENTS

| | | | | |
|---|---|---|---|---|
| 3,723,557 A | * | 3/1973 | Hayes | 260/668 D |
| 4,695,664 A | * | 9/1987 | Whitte | 585/440 |
| 4,722,780 A | 2/1988 | Franck et al. | 208/65 |
| 5,202,097 A | 4/1993 | Poussin | 422/218 |
| 5,712,313 A | * | 1/1998 | Kramer et al. | 518/706 |

FOREIGN PATENT DOCUMENTS

| | | |
|---|---|---|
| DE | 2 151 976 | 4/1973 |
| EP | 0 001 927 | 5/1979 |

OTHER PUBLICATIONS

Antos et al. "Catalytic Naphtha Reforming" 1995, Marcel Dekker, Inc pp. 71, 72, 96, 331.*

* cited by examiner

*Primary Examiner*—Thuan D. Dang
(74) *Attorney, Agent, or Firm*—Millen, White, Zelano & Branigan, P.C.

(57) ABSTRACT

Process for the production of aromatic compounds, such as reforming, that uses at least one fixed catalyst bed with a base of platinum and 0.08% rhenium. In said process, before moving onto the bed, the feedstock undergoes a heat exchange with the effluent that is obtained from the process, whereby the exchange is carried out with a pressure drop that is less than 1 bar and a temperature difference that is less than 70° C. The beds are preferably radial and those that are located at the top of the reactor are covered by a cloth layer. The process preferably uses at least two fixed catalyst beds, whereby the first bed (in the direction of circulation of the feedstock) has an Re/Pt ratio by weight that is greater than that of the second bed, and whereby the second catalyst preferably contains at least 0.08% of Re.

18 Claims, 1 Drawing Sheet

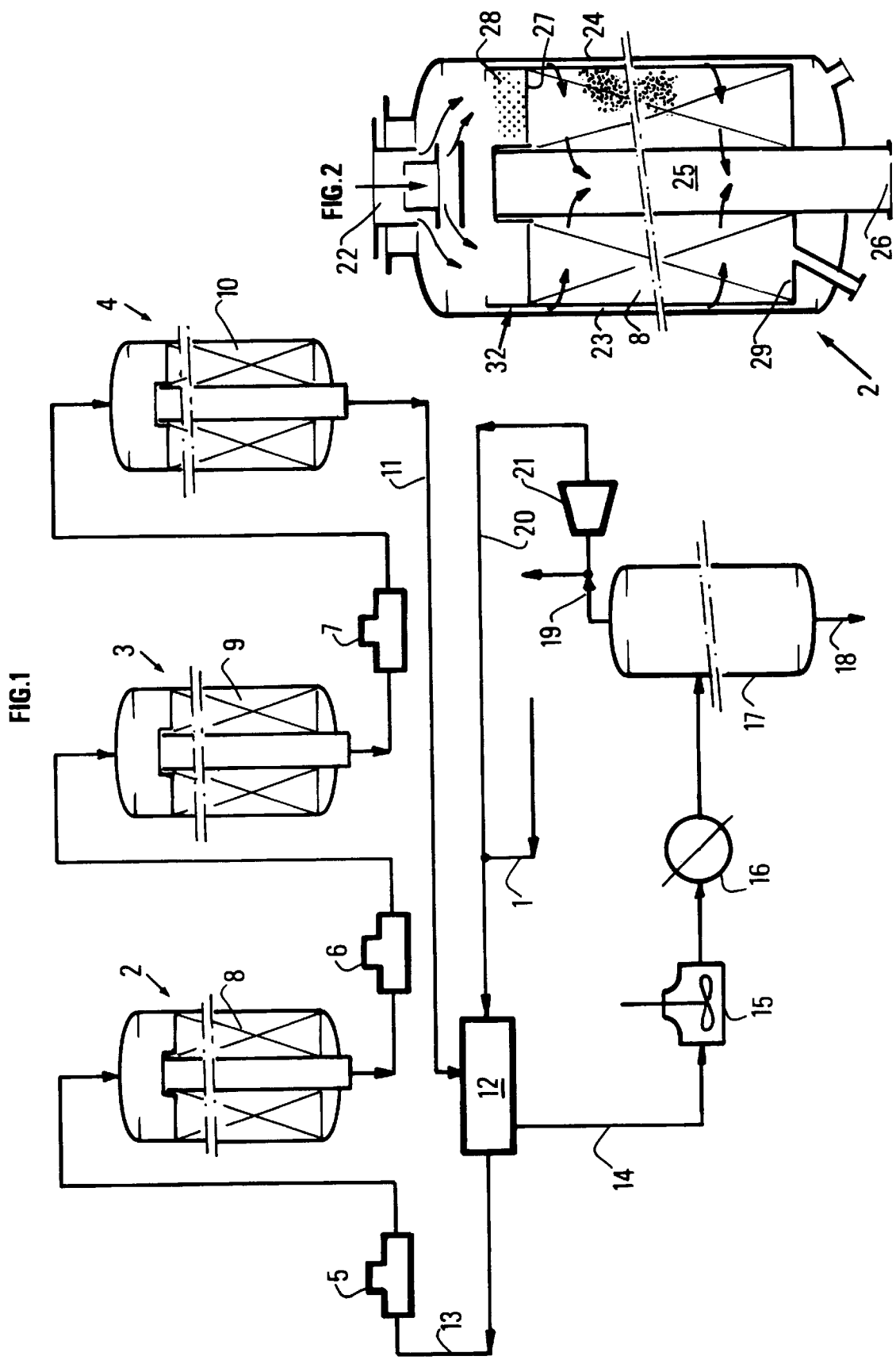

PROCESS AND INSTALLATION FOR THE PRODUCTION OF AROMATIC COMPOUNDS IN A FIXED BED

The invention relates to a process and an installation for the production of aromatic compounds that operates in a fixed catalyst bed.

The invention pertains to, for example, aromatization reactions, i.e., production of aromatic hydrocarbons (benzene, toluene, xylenes) or to reforming reactions.

The catalysts that are generally used contain at least one noble metal, generally platinum, that is deposited on the alumina, as well as at least one promoter metal that is generally rhenium. These catalysts have been extensively described in literature.

Patent FR-2,373,602 thus describes a catalyst that contains an alumina substrate, 0.05 to 0.6% by weight of platinum, 0.02 to 2% by weight of rhenium, 0.05 to 3% by weight of thallium or indium, and 0.1 to 10% by weight of a halogen (generally chlorine).

U.S. Pat. No. 4,722,780 shows a reforming process in which the feedstock moves successively onto two types of fixed beds of two different catalysts. Each catalyst contains platinum and rhenium and optionally an additional metal that is selected from tin, germanium, lead, indium, thallium, and titanium. Catalyst A of the first type of bed (traversed by the feedstock) exhibits an Re/Pt ratio by weight that is greater than the Re/Pt ratio by weight of catalyst B of the second type of bed, and catalyst B contains at least 0.08% by weight of rhenium (relative to the substrate).

In this type of scheme, it thus is possible to use a catalyst according to Patent FR-2,373,602, in particular in the second type of bed. Other catalysts that contain 0.01 to 3% of additional metal, as U.S. Pat. No. 4,722,780 indicates, are also suitable.

Furthermore, whereby the industrial use of such processes is expensive, systems have been developed that make it possible to increase the volumes and the masses of catalyst that are loaded for the same reactor.

U.S. Pat. No. 5,202,097 thus proposes a device that is placed above the catalytic packing. The device comprises a cloth layer that is made of a suitable material that essentially completely covers the packing. Inert balls are placed on this cloth layer to ensure that the cloth layer is held. As this document shows, this device prevents dead zones at the top of the reactor and makes it possible to increase the amount of catalyst in the reactor.

With a view to the same goal of saving catalytic mass, a so-called compacted loading technique, described in Patent FR-2,646,399, was developed, and said technique makes it possible to increase the amount of solid that is introduced in a certain volume.

Means for optimizing the installation in terms of energy were also developed, for example heat exchangers are used on the fluids outside of the reactors. Exchangers that are marketed by the Packinox Company and that are used generally in this field will be cited.

Each of these techniques, to date used separately, was able to provide improvements.

SUMMARY OF THE INVENTION

It has now been discovered, quite surprisingly, that the combination of these techniques used in a process for production of aromatic compounds makes it possible to obtain a synergy whose results go beyond those expected. As a result, the capacity of the installation can be increased by close to 10% by maintaining the yield of reformate and its quality without increasing the wear of the catalyst, and even in a preferred case, the cycle length of the catalyst is increased.

More specifically, the invention relates to a process for the production of aromatic compounds in which the feedstock moves through at least one fixed bed of a catalyst that contains at least platinum and at least 0.08% by weight of rhenium (relative to the substrate), a process in which the fixed beds are arranged in at least one reactor, and in which, before being introduced into the first fixed catalyst bed, the feedstock that is to be treated undergoes a heat exchange with the effluent that is obtained from the last fixed catalyst bed, whereby the heat exchange is carried out with a pressure drop that is less than 1 bar and a temperature difference of at most 70° C.

More particularly, the invention relates to a process for the production of aromatic compounds in which the feedstock moves successively through at least two fixed catalyst beds that contain at least platinum and rhenium, and catalyst A of the first bed or beds (in the direction of circulation of the feedstock) exhibits a ratio by weight of the Re/Pt metals that is greater than the ratio by weight of the Re/Pt metals of catalyst B that is contained in the last bed or beds, a process in which the fixed beds are arranged in at least one reactor and in which, before being introduced into the first fixed catalyst bed, the feedstock that is to be treated undergoes a heat exchange with the effluent that is obtained from the last fixed catalyst bed, whereby the heat exchange is carried out with a pressure drop that is less than 1 bar and a temperature difference of at most 70° C.

At least one radial fixed bed that is located at the top of the reactor is preferably covered by a cloth layer.

The catalyst is therefore in the form of one or more fixed beds in one or more reactors. According to the invention, a single type of catalyst can be used (catalyst B); it can be preceded by another catalyst that is advantageously the catalyst of type A; and it can also be followed by another catalyst for this process.

When a single fixed catalyst bed B is used, the feedstock undergoes a heat exchange with the effluent that is obtained from this bed.

If several fixed beds are used (of A, B or any other catalyst), the feedstock, before entering the first bed, has undergone a heat exchange with the effluent that is obtained from the last bed.

The Description of the invention will be followed from FIG. 1.

The feedstock (petroleum fraction) that is to be treated is brought into the process via pipe 1. It will move successively into reactors 2, 3, and 4 after reheating in furnaces 5, 6 and 7.

Each reactor comprises one or more fixed catalyst beds. According to the invention, first fixed bed 8 contains a catalyst A that exhibits a ratio by weight $(Re/Pt)_A$, last fixed bed 10 contains a catalyst B that exhibits a ratio by weight $(Re/Pt)_B$ that is less than $(Re/Pt)_A$, and preferably the Re content of catalyst B is at least 0.08% by weight (relative to the substrate). Catalyst A is preferably bimetallic with an Re/Pt ratio that is greater than 1, and catalyst B is preferably trimetallic with an Re/Pt ratio that is less than or equal to 1.

Fixed bed catalyst 9 can be of type A or of type B or can exhibit an intermediate Re/Pt ratio between that of A and that of B.

If several beds are arranged in the same reactor, the catalysts between the first bed of the first reactor and the last bed of the last reactor are of type A, B or of an intermediate type.

The effluent that exits the last reactor, here 4, via a pipe 11 reheats the feedstock that is brought via duct 1 through a heat exchanger 12.

Any type of heat exchanger is suitable that exhibits high thermal performance levels, i.e., a temperature difference that is less than 70° C., preferably 50° C. (difference between the temperature of the warm effluent and that of the heated feedstock that exits via pipe 13 of the exchanger) and a pressure drop that is less than 1 bar. The warm feed is often between 10–70° C. or 10–50° C.

Any type of heat exchanger is suitable that exhibits high thermal performance levels, i.e., a warm feed that is less than 70° C., preferably 50° C. (difference between the temperature of the warm effluent and that of the heated feedstock that exits via pipe 13 of the exchanger) and a pressure drop that is less than 1 bar. The temperature difference is often between 10–70° C. or 10–50° C.

Plate exchangers are suitable, and particularly those that are marketed by the Packinox. Company for which the pressure drop is as low as 0.7 bar and the temperature difference is most often 20–40° C.

The cooled effluent that emerges via pipe 14 moves into an air cooler 15, a water cooler 16 and a separator tank 17 that separates the reformate (pipe 18) from the hydrogen gas (pipe 19). A portion of this gas is advantageously recycled via pipe 20, after recompression in compressor 21, to the process in a mixture with the feedstock of pipe 1. The mixing advantageously takes place before the heat exchange.

In a preferred embodiment, the fixed bed comprises in its upper portion a layer of a cloth of suitable form that is made of material that is refractory, essentially inert and essentially impermeable or that has a texture and pores such that said cloth creates a pressure drop that is greater than the one that is produced by the catalytic particle fixed bed, whereby said cloth works with a first essentially inert layer that consists of balls or a particulate material that has a suitable grain size and weight that rests on said cloth and is arranged in a particle fixed bed in such a way that an essentially total covering of said bed is ensured.

Cloth of suitable shape is defined as a cloth that basically conforms in shape to the geometry of the section of the bed.

The cloth layer is preferably introduced above the bed at the top of the reactor, i.e., at the input of the feedstock.

Advantageously, each reactor contains a bed that is equipped with this cloth layer.

The detailed description of the cloth layer and its arrangement in the reactor will not be taken up again here, but reference will be made to the teaching of U.S. Pat. No. 5,202,097, which is fully incorporated in this description.

The introduction of this cloth layer requires the use of a reactor with radial or transversal circulation of the fluid, whereby the fluid that enters through the upper portion of the reactor is distributed into the delimited space between the side wall of the reactor and the fixed bed.

Such a reactor that is shown in FIG. 1 (reactors 2, 3, and 4) is reproduced in more detail in FIG. 2 (obtained from U.S. Pat. No. 5,202,097).

The feedstock that is to be treated is introduced through inlet opening 22 that is located at the top of reactor 2, and it is distributed to annular space 23 that is delimited by the wall of the reactor and wall 24 that holds fixed catalyst bed 8. Wall 24 is pierced with openings, and the feedstock is thus distributed approximately radially into the compartment of fixed bed 8.

After having traversed the catalytic bed in an essentially radial manner, the effluent is recovered by a central collector 25 of cylindrical shape here that is generally a perforated tube that is advantageously covered by a grid, and the effluent exits from it through an opening 26. The effluent (reformate) that exits from the process generally exhibits a temperature of 350–600° C., and more particularly 350–500° C. of even better 400–500° C. Cloth layer 27 is arranged above the bed and is kept in place by a layer 28 of inert material, for example.

FIG. 2 has been incorporated here in part to facilitate an understanding of the invention, but all the other elements that are not incorporated can also be used (layer that replaces lower grid 29 on which the catalytic bed rests, for example).

We note that if the cloth layer is not used, axial and spherical . . . reactors can be used.

To show the synergy between the different elements of the invention, reference will be made to the tables below.

To obtain the same gasoline quality (identical research octane number) that is obtained from the same feedstock, hydrogen yields, C5+ (compounds with at least 5 carbon atoms), LPG (light gases), reformate and the number of operating days at full capacity are posted.

The installation that is considered operates with an H2/hydrocarbon molar ratio of 5 and a P.P.H. of 1.75 in the two reactors, each one containing a fixed catalyst bed. The first catalytic bed has an Re/Pt>1 ratio by weight, and the second has an Re/Pt ratio by weight of 1, whereby the Re content of the second bed is 0.3% by weight. The first catalyst is bimetallic, and the second is trimetallic.

The pressure in the separator tank is 12 bar. The heat exchanger is a plate exchanger whose temperature difference is 33° C., marketed by the Packinox Company. The cloth layer of trademark Texicap$^{(R)}$ is marketed by IFP.

For a given feedstock flow rate of 20,000 barrels/day (or about 3,200 m$^3$/day), Table 1 shows the performance levels that are provided for each element taken separately.

Table 2 shows that the best performance levels of Table 1 (in terms of H2, C5+, reformate and RON yields) are obtained but with an increased capacity of 10% for the same length of time of the catalyst. This represents an enormous savings for the refiner.

Table 2 also shows that the heat exchanger, taken by itself, at this higher capacity (22,000 barrels/day or 3,500 m3/day) does not provide such a benefit. It also shows that the use, in addition, of the cloth layer makes it possible to increase the time of use of the unit while maintaining the high performance level.

The refiner may also, at constant capacity, prefer to increase the gas recycling rate, which has the result of extending the length of the cycle of the catalyst.

To further improve the performance levels, it is possible to initiate the compacted loading of the catalyst, as described in, for example, Patent FR-2,646,399.

TABLE 1

|  | Heat Exchanger | Cloth Layer | 2-Bed Catalysts |
|---|---|---|---|
| Feedstock (m3/j) | 3,200 | 3,200 | 3,200 |
| H2 (m3/m3 of feedstock) | 197 | 197 | 210 |

TABLE 1-continued

|  | Heat Exchanger | Cloth Layer | 2-Bed Catalysts |
|---|---|---|---|
| C5 + yield (% by volume) | 79.36 | 79.36 | 80.36 |
| LPG yield (% by volume) | 11.3 | 11.3 | 10.3 |
| Number of days in operation | 343 | 346.4 | 346.4 |
| C5 + reformate (% by weight) | 84.6 | 84.6 | 86.1 |
| % use of the unit per year | 93.9 | 95 | 95 |

TABLE 2

|  | Heat Exchanger | Cloth Layer | 2-Bed Catalysts | Exchanger + Catalyst | Exchanger + Catalyst + Layer |
|---|---|---|---|---|---|
| Feedstock (m3/j) | 3,500 | 3,500 | 3,500 | 3,500 | 3,500 |
| H2 (m3/m3 feedstock) | 197 | 197 | 210 | 210 | 210 |
| C5 + yield (% by volume) | 79.36 | 79.36 | 80.36 | 80.36 | 80.36 |
| LPG yield (% by volume) | 11.3 | 11.3 | 10.3 | 10.3 | 10.3 |
| Number of days in operation | 341.3 | 346.4 | 346.4 | 346.4 | 350.6 |
| C5 + reformate (% by weight) | 84.6 | 84.6 | 86.1 | 86.1 | 86.1 |
| % use of the unit per year | 93.5 | 95 | 95 | 95 | 96 |

What is claimed is:

1. A reformimg process for the production of aromatic compounds, comprising moving a petroleum faction through at east a first and a last fixed bed of a catalyst containing at least platinum and at least 0.08% by weight of rhenium, wherein the fixed beds are arranged in at least one reactor, and before being introduced into the first fixed catalyst bed, the petroleum faction to be treated is heat exchanged with an effluent obtained from the last fixed catalyst bed, whereby the heat exchange is carried out with a pressure drop that is less than 1 bar for the petroleum faction and a temperature difference of the petroleum faction after heat exchange and the effluent prior to heat exchange of at most 70° C.; and the petroleum faction successively moves through at least two fixed catalyst beds that contain at least platinum and rhenium, and catalyst A of the first bed, in the direction of circulation of the petroleum faction, exhibits a ratio by weight of Re/Pt metals that is greater than the ratio by weight of the Re/Pt metals of catalyst B that is contained in the last bed for producing aromatic compounds.

2. Process according to claim 1, in which the temperature difference is 10–70° C.

3. Process according to claim 1, in which at least one radial fixed bed that is located at the top of the reactor is covered by a fabric layer that is refractory, essentially inert and essentially impermeable or that has a texture and pores such that said cloth creates a pressure drop that is greater than the one that is produced by the catalytic particle fixed bed.

4. A process according to claim 1, in which catalyst B is a trimetallic catalyst with an Re/Pt ratio that is less than or equal to 1.

5. A process according to claim 1, in which catalyst A is bimetallic with an Re/Pt ratio that is greater than 1 catalyst B is trimetallic with an Re/Pt ratio than is less than or equal to 1.

6. A process according to claim 1, in which the catalyst is in a compact form.

7. A process according to claim 1, comprising more than two fixed catalyst beds, wherein at least one bed other than the first bed and the last bed comprises catalyst A, catalyst B, or an intermediate Re/Pt ratio between that of catalyst A and B.

8. A process according to claim 1, wherein the temperature difference of the feed after heat exchange and the effluent prior to heat exchange is 10–50° C.

9. A process according to claim 1, wherein the temperature difference of the feed after heat exchange and the effluent prior to heat exchange is 20–40° C.

10. A process according to claim 1, wherein the heat exchange pressure drop for the feed is about 0.7 bar.

11. A process according to claim 1, wherein the effluent is at a temperature of 350–600° C.

12. A process according to claim 1, wherein the effluent is at a temperature of 350–500° C.

13. A process according to claim 1, wherein the effluent is at a temperature of 400–500° C.

14. A process according to claim 1, having an $H_2$/hydrocarbon molar ratio of 5 and a P.P.H. of 1.75.

15. A process according to claim 1, wherein the feed is about 3500 m³/day.

16. A process according to claim 1, having an $H_2$ flow of 210 m³/(m³ of feed).

17. A process according to claim 1, having a $C^{5+}$ yield of 80.36% by volume and a $C^{5+}$ reformate of 86.1% by weight.

18. A process according to claim 1, having a LPG yield of 10.3% by volume.

* * * * *

UNITED STATES PATENT AND TRADEMARK OFFICE
CERTIFICATE OF CORRECTION

PATENT NO. : 6,544,408 B1
DATED : April 8, 2003
INVENTOR(S) : Jean de Bonneville It is certified that error appears in the above-identified patent and that said Letters Patent is hereby corrected as shown below:

Column 5,
Line 43, reads "at east" should read -- at least --

Column 6,
Line 19, reads "1 catalyst" should read -- 1 and catalyst --
Line 20, reads "ratio than" should read -- ratio that --
Line 36, reads "drop for" should read -- drop of --

Signed and Sealed this

Twenty-ninth Day of June, 2004

JON W. DUDAS
*Acting Director of the United States Patent and Trademark Office*